(12) United States Patent  
Richerand

(10) Patent No.: US 8,834,724 B1  
(45) Date of Patent: Sep. 16, 2014

(54) METHOD AND APPARATUS FOR SEPARATION OF FLUIDS BY MEANS OF INDUCED GAS FLOTATION AND ADVANCES IN SAID TECHNOLOGY

(75) Inventor: Frank A. Richerand, Covington, LA (US)

(73) Assignee: Enviro-Tech Systems, L.L.C., Folsom, LA (US)

( * ) Notice: Subject to any disclaimer, the term of this patent is extended or adjusted under 35 U.S.C. 154(b) by 363 days.

(21) Appl. No.: 13/208,865

(22) Filed: Aug. 12, 2011

Related U.S. Application Data

(60) Provisional application No. 61/453,185, filed on Mar. 16, 2011.

(51) Int. Cl.
  *C02F 1/24* (2006.01)
  *B01D 17/035* (2006.01)
  *B03D 1/24* (2006.01)

(52) U.S. Cl.
  CPC .. *C02F 1/24* (2013.01); *B03D 1/247* (2013.01)
  USPC .......................... 210/703; 210/201; 210/221.2

(58) Field of Classification Search
  CPC .... C02F 1/24; B01D 17/0205; B03D 1/1406; B03D 1/1462; B03D 1/1493; B03D 1/247; B03D 2203/006
  USPC ....................... 210/703, 803, 221.2, 202, 201
  See application file for complete search history.

(56) References Cited

U.S. PATENT DOCUMENTS

| | | | |
|---|---|---|---|
| 3,647,069 A | 3/1972 | Bailey | |
| 3,773,179 A * | 11/1973 | Hurst | 210/194 |
| 4,222,871 A * | 9/1980 | Lefeuvre | 210/636 |
| 4,800,025 A | 1/1989 | Bibaeff | |
| 4,824,579 A * | 4/1989 | George | 210/703 |
| 4,889,638 A | 12/1989 | Rockford et al. | |
| 5,158,678 A * | 10/1992 | Broussard, Sr. | 210/221.1 |
| 5,407,584 A | 4/1995 | Broussard, Sr. | |
| 5,509,535 A * | 4/1996 | Schneider | 209/169 |

(Continued)

*Primary Examiner* — Thomas M Lithgow
(74) *Attorney, Agent, or Firm* — Garvey, Smith, Nehrbass & North, L.L.C.; Gregory C. Smith; Julia M. FitzPatrick

(57) ABSTRACT

In reviewing the oil industry for the past 30 years there has been a need for a low maintenance, low cost, space saving Induced Gas Flotation Cell. With this said, a method has been invented to do this by making several changes in the present design philosophy of induced Gas flotation. First by providing a cylindrical vessel we have made a stronger unit with better structural integrity, and minimizing the opportunity for accelerated corrosion, secondly by changing the vital operations of the unit, specifically the recirculation rate of the system, lowering the overall discharge flow and increasing the discharge pressure we have been able to increase retention time and increase bubble dispersion, part and parcel with this change is the addition of multiple Eductors in each cell providing greater gasification per cell. The combination of these changes provides a greater overall efficiency thus the overboard water quality is improved using a smaller vessel to accomplish the objective. As important, is the placement of the Eductor in the vessel creating a rolling effect to move separated oil to a spillover point for collection. Thus the collection point is improved by eliminating costly mechanical wipers and using multiple adjustable spillover weirs in each cell to recover the collected oil contaminant. during the process and will help preclude upset and or surge conditions from affecting the water quality at the effluent. The overall design and combined affect of these important features makes this an improvement over all conventional technology used today. The above features are a marked advancement, when taken in combination, to current induced gas flotation technology.

10 Claims, 1 Drawing Sheet

(56) References Cited

U.S. PATENT DOCUMENTS

| | | |
|---|---|---|
| 5,656,173 A | 8/1997 | Jordan et al. |
| 2004/0256325 A1 | 12/2004 | Frankiewicz et al. |
| 2007/0114183 A1 | 5/2007 | Lee et al. |
| 2009/0294375 A1 | 12/2009 | Lange et al. |

* cited by examiner

METHOD AND APPARATUS FOR SEPARATION OF FLUIDS BY MEANS OF INDUCED GAS FLOTATION AND ADVANCES IN SAID TECHNOLOGY

CROSS-REFERENCE TO RELATED APPLICATIONS

Priority of U.S. Provisional Patent Application Ser. No. 61/453,185, filed Mar. 16, 2011, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to separation of fluids. More particularly, the present invention relates to a method for the separation of two liquids which are immiscible with each other. Still more particularly the present invention discloses a method and an apparatus for separating oil from water efficiently by means of induced gas flotation utilizing advancements of said technology in a cylindrical vessel.

2. General Background of the Invention

In the present state of the art, the separation of two distinct fluids is undertaken in separate operations, involving rectangular or cylindrical vessels with either mechanical or hydraulic. These vessels adhere to outdated design philosophies. The invention listed in this submission incorporates advanced technology taking a significant leap forward in design philosophy.

The following U.S. Patents are incorporated herein by reference:

| PATENT NO. | TITLE | ISSUE DATE |
| --- | --- | --- |
| 3,647,069 | Enclosed Flotation Apparatus and Process | Mar. 7, 1972 |
| 4,800,025 | Apparatus and Process for the Gas Flotation Purification of Oil-Contaminated Water | Jan. 24, 1989 |
| 4,889,638 | Agitation and/or Gas Separation and Dispersed Gas Flotation | Dec. 26, 1989 |
| 5,407,584 | Water Clarification Method | Apr. 18, 1995 |
| 5,656,173 | Method of Removing Dispersed Oil From An Oil in Water Emulsion Employing Aerated Solutions Within a Coalescing Media | Aug. 12, 1997 |
| 2004/0256325 | Vertical Gas Induced Flotation Cell | Dec. 23, 2004 |
| 2007/0114183 | Vessel and Method for Treating Contaminated Water | May 24, 2007 |
| 2009/0294375 | Fluid Treatment Apparatus | Dec. 3, 2009 |

BRIEF SUMMARY OF THE INVENTION

The process and apparatus of the present invention solves the problems in the prior art in that it provides a process wherein the separation principle of Induced Gas Flotation wherein two different liquids or variable specific gravities are separated and removed individually from the device. Additionally, the rotation of the process fluid, typically produced water, is designed so that the free oil skim created from the separation process migrates to an adjustable oil spillover weir for removal. This process is designed to meet the necessary discharge requirements of the U.S. government. With the proper flow regime, this process elevates itself over previous separation apparatus by including multiple advancements in Induced Gas Flotation technology.

Therefore, it is a principal object of the present invention wherein the combination of these multiple technologies creates an apparatus that is considered a next generation Induced Gas Flotation (IGF) system.

It is a further object of the present invention whereby the combination provides a more efficient unit over previous evolutions of similar products.

It is a further object of the present invention whereby the combination makes the equipment more versatile in its use in the oil and gas industries.

It is a further object of the present invention that advancements in Eductor design make the gasification and dispersion of bubbles more efficient.

It is a further object of the present invention that in-service removal of Eductor system eliminates downtime for replacement or maintenance of Eductor system.

It is a further object of the present invention whereby a clockwise rotation of the process fluid is generated by Eductor operation allowing for the oil skim to migrate to the spillover point without the aid of mechanical wipers as in obsolete designs.

It is a further object of the present invention whereby the small bubbles produced for oil removal has an external adjustment feature to enable the operator to match bubble size with the oil/solid particle size by allowing adjustment of the air gas mixture with the process recirculation water thus enabling the creation of either small bubble or larger bubbles depending on the needs of the incoming process.

It is a further object of the present invention to provide an external means to filter/strain or remove oil droplets/solids particles thru a filtering device attached to the discharge of the recirculation system whereas a certain portion of the cleaned process passes thru a device to filter/strain subsequently to lower the contaminants in the recirculation fluid process thereby lowering overall the contaminant in the process providing a more efficient technique for the recirculation of the water for a lower discharge PPM.

It is a further the object of the present invention to provide or allow for a provision for the addition of cells for further processing thus allowing for increased efficiency thru added retention time.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
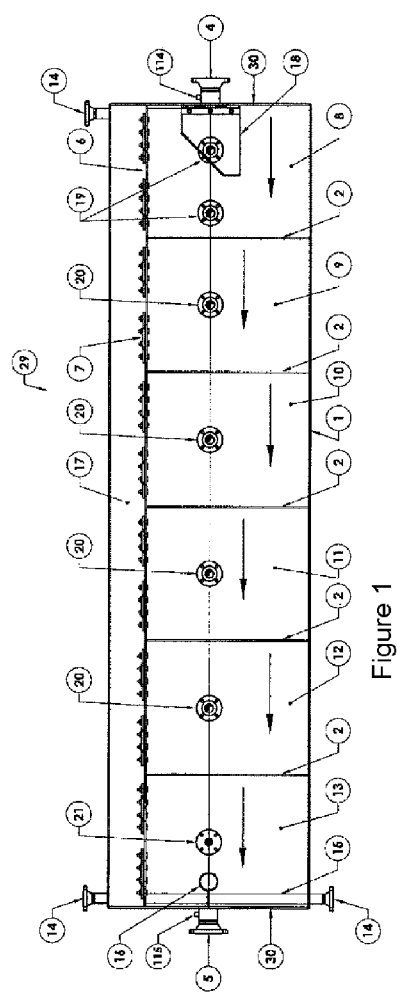
FIG. 1 illustrates a schematic plan view of the present invention.

FIG. 1 illustrates a schematic plan view of the present invention, Enviro-Cell™ 29, the present invention apparatus and immiscible fluids separation method 29, consisting of an Induced Gas Flotation (IGF) vessel 29. Schematically illustrated by the immiscible fluid primary flow path 3, the raw immiscible fluid to be separated enters the present invention at immiscible fluid inlet flange 4, the fluid proceeding subsequently through the separation method of Enviro-Cell™ 29, and finally a recovered portion of the process fluid (typically water) exiting the invention at clean water outlet flange 5. Oil separated during the immiscible fluids separation process is collected in oil collection reservoir (IGF) 17. Oil collection reservoir 17 is in communication with all three recovered oil outlet nozzles 14 by means of collected oil reservoir conduit 15. The oil collection in oil collection reservoir (IGF) 17 is the product of oil separated by IGF starting at the inlet distribution cell 8 then subsequently entering the four (4) active processing cells beginning with IGF processing cell #1 9, IGF processing cell #1 10, IGF processing cell #3 11, and IGF processing cell #4 12. The final quiescent cell 13 acts as a final separation compartment to provide the cleanest water for recirculation and or subsequent discharge clean water outlet flange 5. Waste settlement portions of the raw fluid processed by the Induced Gas Flotation (IGF) vessel 29 are extracted through (IGF) drain 22 which can also be utilized to empty the apparatus of all fluids. Sampling of the raw unprocessed fluid and the processed fluid may be performed at sample connection for inlet 114 and sample connection for outlet 115.

Figure 2:
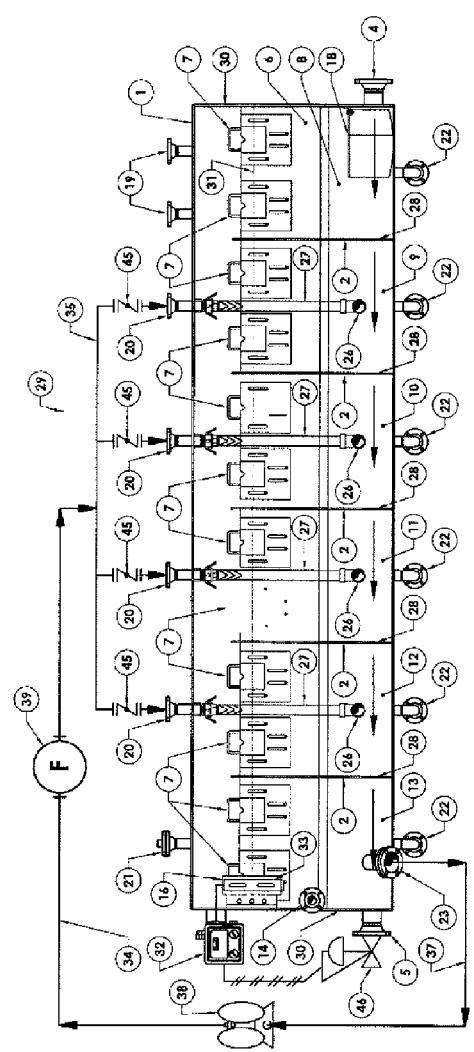
FIG. 2 illustrates a schematic rear elevation view of induced gas flotation (IGF) vessel of the apparatus of the present invention.

FIG. 2 illustrates a schematic rear elevation view of Induced Gas Flotation (IGF) vessel 29, schematically depicting the immiscible fluid primary flow path 3 as the fluid passes through baffle channel 28 from the inlet distribution cell 8 and into processing cell #1 9, processing cell #1 10, processing cell #3 11, processing cell #4 12, and finally into recirculation cell 13. The finished process fluid (typically water) accumulates in quiescent cell 13, the accumulated water having an IGF process normal operating level 31. Water level 31 increases during fluid processing and is maintained by level controller 32 with the aid of a float 33 inside a stilling well 16. Collected clean quiescent cell 13 fluid, typically water, is discharged via clean water outlet flange 5. Sampling of collected quiescent cell 13 is available by means of sample collection for outlet 115. Solids collection in conjunction with the (IGF) drain 22, can be utilized to draw off undesirable constituents of the processed fluid and may also be used to empty all fluids from the induced gas flotation (IGF) vessel 29. Oil collected in Induced Gas Flotation (IGF) vessel 29 passes into oil collection reservoir (IGF) 17 by overflowing an adjustable oil spillover weir 7. Each of the induced gas flotation (IGF) processing compartments features an IGF cell separation baffle 2 to expeditiously maintain fluid circulated within the induced gas flotation (IGF) vessel 29. A portion of the fluid collected in the quiescent cell 13 is pumped by the recirculation pump 38 through a filter/strainer device 39 and subsequently into the recirculation header 35 and equally distributed to the four (4) Eductor discharge pipes 27. The distributed clean water flows under pressure into each Eductor for mixing with the blanket gas or other inert gas to create the fine bubble for oil particle removal. Each Eductor has an adjustable valve 36 (See FIG. 3) to regulate the mixture of gas and liquid to create the bubbles. The feature of Eductor adjustment is crucial to matching the size of the bubble with the incoming oil droplet size. Bubbles eject through the bottom of each Eductor 26 (See FIG. 3) and rise to the surface attaching to suspended or free oil droplets thus bringing them to a collection point for removal. The separated oil forms a skim that flows over individual adjustable oil spillover weirs 7 and into oil collection reservoir (IGF)17. This collected oil can be sent for further processing or disposal via oil outlet nozzle 14.

Figure 3:
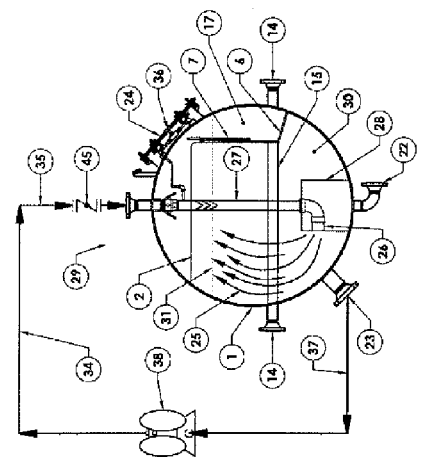
FIG. 3 illustrates a schematic inlet side elevation view of the Induced Gas Flotation (IGF) vessel of the apparatus of the present invention.

FIG. 3 illustrates a schematic side elevation view of Induced Gas Flotation (IGF) vessel 29. The four (4) IGF processing cells are separated from each other by an IGF separation baffle 2. IGF processing cell #4 12 (See FIG. 2) is separated from quiescent cell 13 (See FIG. 2) by IGF separation baffle 2. Waste material accumulating at the bottom of induced gas flotation vessel 29 can be withdrawn by means of IGF drain 22. Each of the four (4) Eductors features an air mixing valve 36. Pump suction piping 37 connects quiescent on cell 13 (See FIG. 2) to the input for the recirculation pump. The output of recirculation pump 38 is connected to an inline filter/strainer device 39 and connected to the pumps discharge manifold 35 by means of pump discharge piping 34. Each of the six (6) IGF processing cells is in communication with oil collection reservoir (IGF) 17. Oil collected in oil collection reservoir (IGF) 17 is drawn off by means of a common set of nozzles 14 via IGF collected oil reservoir conduit 15. The fluid to be additionally processed is combined with a controlled gas injection, the combination ejected from Eductor nozzle 26 of each of the four (4) partitioned IGF processing cells. The Eductor nozzle 26, of each of the four (4) Eductors 27 is positioned to create IGF processing cell clockwise fluid circulation 25 in the vertical plane of the fluid processed and accumulated in each of the four (4) partitioned IGF processing cells. This clockwise rotation as shown in FIG. 3 migrates the collected oil skim to spillover an adjustable oil spillover weir 7. An access port 24 is provided for each of the six (6) IGF processing cells, allowing for inspection and routine maintenance.

All measurements disclosed herein are at standard temperature and pressure, at sea level on Earth, unless indicated otherwise. All materials used or intended to be used in a human being are biocompatible, unless indicated otherwise.

| PARTS LIST | |
|---|---|
| Parts Number | Description |
| 2 | separation baffle |
| 3 | primary flow path |
| 4 | fluid inlet flange |
| 5 | clean water outlet flange |
| 7 | oil spillover weir |
| 8 | inlet distribution cell |
| 9 | IGF processing cell #1 |
| 10 | IGF processing cell #2 |
| 11 | IGF processing cell #3 |
| 12 | IGF processing cell #4 |
| 13 | quiescent cell |
| 14 | outlet nozzles |
| 15 | oil reservoir conduit |
| 16 | sitting well |
| 17 | oil collection reservoir |
| 22 | IGF drain |
| 24 | access port |
| 25 | fluid circulation |
| 26 | Eductor |
| 27 | Eductor discharge pipes |
| 29 | induced gas flotation vessel |
| 31 | water level |
| 32 | level controller |

-continued

PARTS LIST

| Parts Number | Description |
| --- | --- |
| 33 | flow |
| 34 | discharge piping |
| 35 | discharge manifold |
| 36 | adjustable valve |
| 37 | pump suction piping |
| 38 | recirculation pump |
| 39 | filter/strainer device |
| 114 | inlet |
| 115 | outlet |

The foregoing embodiments are presented by way of example only; the scope of the present invention is to be limited only by the following claims.

The invention claimed is:

1. A method of separating two distinct and different fluids one lighter in specific gravity than the other able to meet the overboard discharge requirements of the U.S. government, comprising the following steps:
   (a) providing a vessel, having a primary separation chamber;
   (b) separating fluids in the vessel to allow for free and suspended solids along with free oil, gas, and grease to be removed in the primary separation chamber;
   (c) including an induced gas flotation process which provides a finely dispersed bubble in the liquid to accelerate the lift necessary for separation of fine oil droplets, emulsified oil droplets, and suspended solids, for creating a clockwise rotation in the flotation portion of the vessel as a method to move the separated oil to a spillover point on the flotation cell side of the process; and
   (d) utilizing multiple nozzles on either side of the vessel, so that the flow can be reversed from left to right or right to left depending on the placement of the vessel and existing piping.

2. The method in claim 1, wherein the process includes providing recirculation to an eductor system that is properly designed to maximize bubble dispersion.

3. The method in claim 1, further comprising the step of including flow diverters in each processing cell assisting in the clockwise roll of the process fluid allowing for the oil skim to migrate towards an adjustable oil spillover weir, wherein the flow diverters eliminate channeling of the process fluid through the flotation cells by directly affecting the flow path at a ninety degree angle.

4. The method in claim 1, further comprising the step of providing availability for reversible flow path depending on the layout of the location the unit is placed.

5. The method in claim 1, wherein the method includes the addition of a filter/strainer device between a recirculation pump discharge and an eductor system including one or more eductors, to clean a portion of the recirculation water before entering the one or more eductors thereby providing cleaner water to the eductor system making the recirculation process more effective, to filter the process so as to eliminate contaminants in the recirculation water thus preventing the one or more eductors from the potential of plugging and reduce incoming contaminants for an overall cleaner process.

6. The method in claim 1, further comprising the step of the addition of multiple cells for increased processing thus allowing for greater efficiency thru added retention time and added gasification.

7. The method in claim 1, further comprising the step of the addition of multiple eductors in each cell for increased gasification per overall cross sectional area of each cell.

8. The method in claim 7, wherein the eductors are externally adjustable to prevent entry into the vessel especially when gas or contaminant is present thus eliminating potential harm to an operator and eliminating the need to enter the plane of the vessel for maintenance.

9. A method of separating two distinct and different fluids one lighter in specific gravity than the other able to meet the overboard discharge requirements of the U.S. government, comprising the following steps:
   (a) providing a vessel, having a primary separation chamber;
   (b) separating fluids in the vessel to allow for free and suspended solids along with free oil, gas, and grease to be removed in the primary separation chamber;
   (c) including an induced gas flotation process which provides a finely dispersed bubble in the liquid to accelerate the lift necessary for separation of fine oil droplets, emulsified oil droplets, and suspended solids, for creating a clockwise rotation in the flotation portion of the vessel as a method to move the separated oil to a spillover point on the flotation cell side of the process;
   (d) utilizing multiple nozzles on either side of the vessel, so that the flow can be reversed from left to right or right to left depending on the placement of the vessel and existing piping; and
   (e) providing multiple cells for increased processing thus allowing for greater efficiency thru added retention time and added gasification.

10. An apparatus for separating two distinct and different fluids one lighter in specific gravity than the other able to meet the overboard discharge requirements of the U.S. government, comprising:
   (a) a vessel;
   (b) a primary separation chamber in the vessel for separating fluids in the vessel to allow for free and suspended solids along with free oil, gas, and grease to be removed in the primary separation chamber;
   (c) an induced gas flotation portion of the vessel for providing a finely dispersed bubble in the fluids to accelerate the lift necessary for separation of fine oil droplets, emulsified oil droplet, and suspended solids, for creating a clockwise rotation in the flotation portion as a method to move the separated oil to a spillover point on the flotation portion of the vessel;
   (d) multiple nozzles on either side of the vessel, so that the flow can be reversed from left to right or right to left depending on the placement of the vessel and existing piping;
   (e) a filter/strainer device positioned between a recirculation pump discharge and an eductor system including one or more eductors, to clean a portion of the recirculation water before entering the one or more eductors thereby providing cleaner water to the eductor system making the recirculation process more effective, to filter the process so as to eliminate contaminants in the recirculation water thus preventing the one or more eductors from the potential of plugging and reduce incoming contaminants for an overall cleaner process.

* * * * *